(12) United States Patent
Liss

(10) Patent No.: US 10,451,313 B2
(45) Date of Patent: Oct. 22, 2019

(54) EFFICIENT SOLAR ENERGY COLLECTOR

(71) Applicant: Aaron Liss, Silver Spring, MD (US)

(72) Inventor: Aaron Liss, Silver Spring, MD (US)

( * ) Notice: Subject to any disclaimer, the term of this patent is extended or adjusted under 35 U.S.C. 154(b) by 71 days.

(21) Appl. No.: 15/808,979

(22) Filed: Nov. 10, 2017

(65) Prior Publication Data

US 2019/0145664 A1    May 16, 2019

(51) Int. Cl.
*F24S 20/30* (2018.01)
*F24S 20/20* (2018.01)
*F24S 23/00* (2018.01)

(52) U.S. Cl.
CPC .............. *F24S 20/30* (2018.05); *F24S 20/20* (2018.05); *F24S 23/00* (2018.05)

(58) Field of Classification Search
CPC ............. F24S 20/20; F24S 20/30; F24S 23/00
See application file for complete search history.

(56) References Cited

U.S. PATENT DOCUMENTS

| | | | | |
|---|---|---|---|---|
| 1,661,473 A * | 3/1928 | Goddard | ................. | F24S 23/74 126/685 |
| 4,204,914 A * | 5/1980 | Diggs | ..................... | B01D 3/00 202/176 |
| 4,280,482 A * | 7/1981 | Nilsson, Sr. | ............ | F03G 6/067 126/618 |
| 4,313,024 A * | 1/1982 | Horne | ..................... | H02S 10/30 136/253 |
| 9,689,586 B2 * | 6/2017 | Wyle | ........................ | F24S 23/71 |
| 2008/0184990 A1 * | 8/2008 | Tuchelt | ..................... | F03G 6/06 126/684 |
| 2008/0308154 A1 * | 12/2008 | Cart | ........................ | F24S 40/20 136/259 |
| 2013/0139808 A1 * | 6/2013 | Lin | ........................ | F24S 20/20 126/681 |

* cited by examiner

*Primary Examiner* — David J Laux

(57) ABSTRACT

The invention relates to a solar conversion system, comprising solar focusing means for focusing solar energy incident thereon into a solar beam, said solar beam at its smallest cross section having a cross section less than about ten percent of the cross section of the solar focusing means, container means to retain a fluid to be heated by solar energy, said container means having an opening approximately the size of the smallest cross section of the solar beam, positioning means operable for positioning said focusing means so that the smallest cross section of said solar beam is located at the opening so that substantially all of the solar beam enters into said container, dispersing means positioned in said container in the path of said solar beam operable to disperse the solar beam in said container, thereby reducing the amount of reflected solar beam exiting the opening.

4 Claims, 2 Drawing Sheets

EFFICIENT SOLAR ENERGY COLLECTOR

BACKGROUND OF THE INVENTION

The present invention relates to an efficient solar energy conversion system, and particularly to a simple system for converting solar energy to heat suitable for creating heat suitable for cooking food, driving an engine, to create electricity, providing hot water for many applications, and other uses.

From early times of mankind, it has been recognized that solar energy is an abundant source of energy. The discovery of the magnifying glass was a breakthrough on concentrating solar energy for igniting a fire. The discovery of methods for the conversion solar energy into electricity was another breakthrough.

There are a multitude of devices to capture solar energy in some useful way; however, it is well known that all known devices suffer from relatively poor conversion efficiency. Generally, the efficiency of converting solar energy is less than about 25%. It is rare that a conversion of solar energy to another form of energy such as electricity, or heat is greater than about 50%, and the higher efficiency requires highly specialized equipment, thereby making an efficient system relatively unavailable for wide distribution to many developing countries.

There is a need for an efficient solar conversion system to heat that is relatively inexpensive to implement and to maintain.

SUMMARY OF THE INVENTION

The invention relates to a solar conversion system, comprising solar focusing means for focusing solar energy incident thereon into a solar beam, said solar beam at its smallest cross section having a cross section substantially less than the cross section of the solar focusing means, container means to retain a liquid to be heated by solar energy, said container means having an opening approximately the size of the smallest cross section of the solar beam, positioning means operable for positioning said focusing means so that the smallest cross section of said solar beam is located at the opening so that substantially all of the solar beam enters into said container, dispersing means positioned in said container in the path of said solar beam operable to disperse the solar beam in said container, thereby reducing the amount of reflected solar beam exiting the opening.

Preferably, the dispersing means is in the form of a cylinder oriented with its pointed end closest to the entering solar beam. Preferably, the dispersing means is in the form of a mirror oriented to reflect the entering solar beam away from the opening. Preferably, the liquid is water.

The invention enables a simple focusing system such as a Fresnel lens the size of a letter to serve effectively. Hence, the invention is extremely inexpensive, highly portable, and easily implemented.

The invention simulates what is called a "black body" in physics and is often mentioned in astronomy. In physics, a "black body" allows energy such as solar energy as well as other electromagnetic energies to enter, and nothing exits. Hence, a "black body" appears to be perfectly black because there is no reflected energy.

The invention by its design substantially inhibits sunlight entering it from exiting. Thus, substantially all of the entering sunlight is converted to heat because the sunlight is virtual trapped in the container and this enables an unprecedented high conversion of sunlight to heat.

PREFERRED EMBODIMENT OF THE INVENTION

Figure 1:
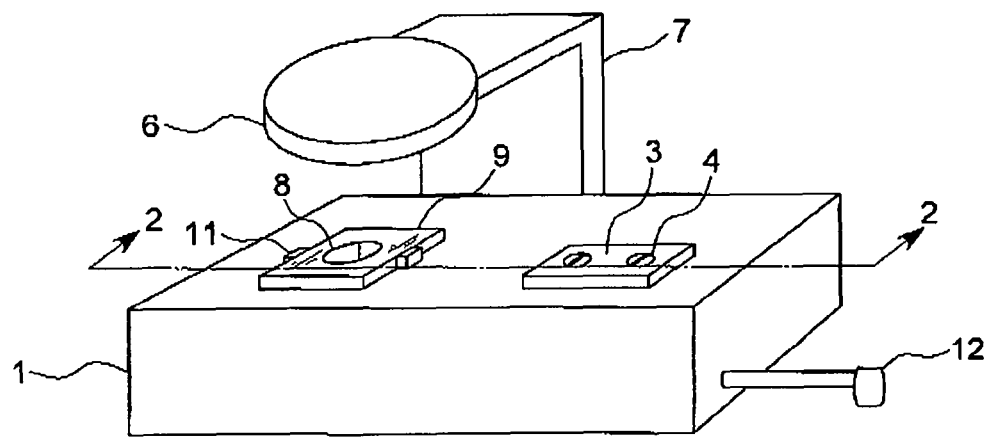
FIG. 1 is a perspective view of an embodiment of the invention.

FIG. 1 shows a perspective view of an embodiment of the invention. The container 1 is a rectangular parallelepiped; however, container 1 is not limited to this shape. Plate 3 is removable to expose an opening to allow a liquid (not shown) to be placed into the container 1. Typically, the substance can be water, or soup, or some other liquid to be heated, or cooked. The plate 3 is maintained closed with screws 4, but other convenient arrangements can be used.

Focusing means 6 such as a magnifying glass, a Fresnel lens, or the like is to focus sunlight. The focusing means 6 is connected to support means 7 for holding the focusing means 6 in a desirable position for focusing sunlight onto the aperture 8. The support means 7 can be a conventional design suitable for the operations for this invention. The support means 7 can be hand held, if necessary.

As used herein, the "cross section" of the focusing means 6 is the area of the incident sunlight on the focusing means 6 and available to be focused. Support means 7 can be made with articulated elements to provide flexibility in orienting and positioning focusing means 6 optimally for concentrating sunlight at the aperture 8 using known technology.

It is preferable, but not necessary, to cover aperture 8 with a transparent material such as glass plate 9, or a plastic plate, or the like. By covering aperture 8, foreign objects such as dirt and bugs are inhibited from entering the container 1. In addition, it is possible to substantially seal the container 1 so that the container 1 operates like a known pressure cooker to reach temperatures greater than the boiling temperature of the liquid. This feature could be advantages in a relatively low pressure environment such as on a mountain.

In general, some sunlight incident on the plate 9 will be reflected away and will not enter aperture 8. The same issue occurs in photography and the well known solution is to coat a lens to minimize reflections. It is preferable to coat the plate 9 with a material such as used in photography to minimize the reflection of light, thereby to maximize the amount of focused sunlight entering the aperture to increase the amount of sunlight available to be converted to heat.

The plate 9 is retained in its position by components 11. Components 11 can be of any convenient design. A draining means 12 such as a spigot allows liquid inside the container 1 to be drained out.

The properties of a black hole can be simulated in the invention to a high level by using an aperture 8 sufficiently large enough to pass the sunlight focused by the focusing means 6, but not too large to allow the easy reflection of the sunlight out of the aperture 8. In addition, it is important to design the interior of the container 1 to minimize the amount of sunlight reflected out of the container 1 through the only possible exit, the aperture 8. It is advantageous to have the inside walls of the container 1 a dark color, preferably black to minimize reflections within the container 1, and to enhance the absorption of the solar energy to create heat.

In simple terms, the sunlight entering the container 1 cannot reflect out of the aperture 8 easily if the aperture 8 is as small as possible for the focused sunlight to enter the aperture 8. It is important to divert sunlight entering the aperture 8 to minimize the likelihood of sunlight being reflected out to the aperture 8.

Figure 2:
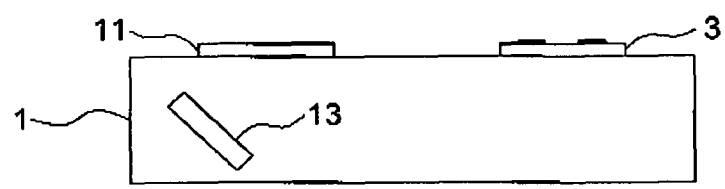
FIG. 2 is a sectional view of the embodiment shown in FIG. 1 along line 2-2.

Attention is now turned to FIG. 2 which is a sectional view of the container 1 in FIG. 1 along the line 2-2. Dispersing means such as the mirror arrangement 13 in FIG. 2 is used to disperse the sunlight entering the aperture 8 into the container 1. Having the interior walls of the container 1 dark, or preferably black minimizes reflections of the sunlight and increases the absorption of the energy in the sunlight by the interior of the container 1 and if there is a liquid such as water in the container 1, the energy is absorbed by the water to heat the water directly by the incident sunlight and indirectly by the sunlight heating the interior walls of the container 1.

Thus, the invention as shown in FIG. 2 operates with remarkable efficiency to change entering sunlight into heat energy because energy cannot be destroyed or otherwise lost. The sunlight concentrated by the focusing means 6 primarily enters the container 1 through the aperture 8 with almost all of the sunlight remaining in the container 1 to be absorbed by the interior walls of the container 1 and any liquid such as water in the container 1. Only an insignificant amount of sunlight in the container 1 is reflected out of the container 1, or lost by reflection from the focusing means 6.

It is estimated that the conversion of sunlight in the container 1 is approximately 90% for the sunlight entering the aperture 8, thereby exceeding the prior art technology with a very simple mechanical system.

It is estimated that the use of the plate 9 might reduce the sunlight passing through the plate 9 into the aperture 8, but the estimate based on the sunlight incident on the plate 9 (coated or uncoated) still exceeds the prior art systems. The advantage of the plate 9 is that it can make the container 1 a closed system. Liquid cannot spill out, but what is more important, the liquid can be superheated if desired. This can make the invention act like a well known pressure cooker for cooking foods rapidly at a temperature greater than the normal temperature for boiling water.

Figure 3:
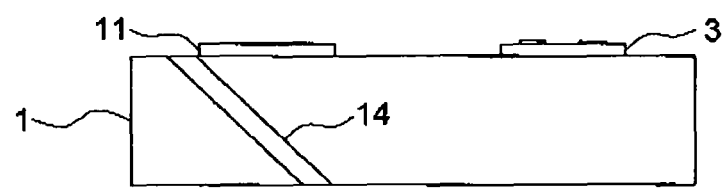
FIG. 3 is a sectional view similar to FIG. 2 with a different arrangement.
Figure 4:
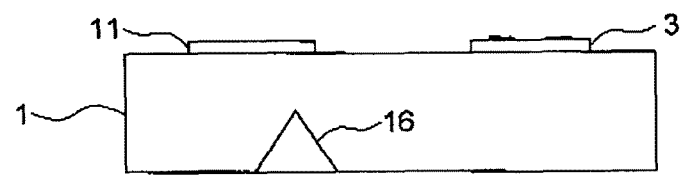
FIG. 4 is a sectional view similar to FIG. 3 with a different arrangement.

FIG. 3 shows another arrangement with a mirror 14. Mirror 14 provides reflection of the focused sunlight over a wide range of incident angles to the aperture 8. FIG. 4 shows a dispersing means in the form of a cylinder 16. Thus, the goal of dispersing the sunlight in the interior of the container 1 can be achieved in many ways.

Figure 5:
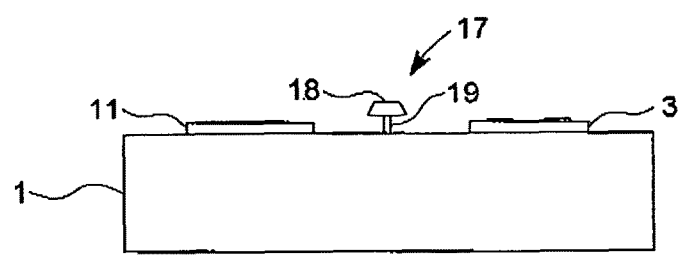
FIG. 5 is a front elevational view of an embodiment of the invention.

FIG. 5 shows a simplified front elevational view of the invention without showing the means 6 with the added safety system 17. Safety system 17 is similar to the standard pressure release system used on pressure cooker. Safety system 17 includes a weighted portion 18 that rests on a short tube 19 which is fluidly connected to the interior of the container 1. If the internal pressure of the container 1 becomes excessive, the component 17 releases the pressure to avoid an explosion.

Figure 6:
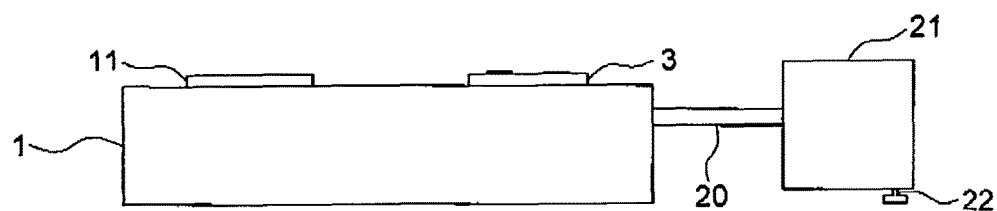
FIG. 6 is a side elevational view showing an application of the invention.

FIG. 6 shows a simplified front elevational view of the invention without the focusing means 6 being shown, and showing added components pipe 20 fluidly connected to the interior of container 1, and also connected to a system 21 for condensing steam. This addition allows for the removal of boiled water. The system 21 includes a means to remove liquid from the system 21 such as a faucet 22.

The invention claimed is:

1. A solar conversion system, comprising solar focusing means for focusing solar energy incident thereon into a solar beam, said solar beam at its smallest cross section having a cross section less than about ten percent of the cross section of the solar focusing means, container means to retain a substance to be heated by solar energy, said container means having an opening approximately the size of the smallest cross section of the solar beam, positioning means operable for positioning said focusing means so that the smallest cross section of said solar beam is located at the opening of said container so that substantially all of the solar beam at the opening enters into said container, dispersing means positioned in said container in the path of said solar beam operable to disperse the solar beam in said container, thereby reducing the amount of reflected solar beam exiting the opening, and further comprising a transparent plate covering said opening and means to retain the plate in its position, wherein said plate is maintained in its position to allow the pressure within said container to become elevated, and pressure release means to allow the pressure within said container to be released if the pressure exceeds a predetermined amount.

2. The solar conversion system of claim 1, wherein said dispersing means includes at least one of the following, a mirror, a prism, and a cone.

3. The solar conversion system of claim 2, wherein the interior walls of said container are black.

4. The solar conversion system of claim 1, wherein said plate has a coating to minimize the reflection of externally incident sunlight.

\* \* \* \* \*